United States Patent
Lutter (10) Patent No.: US 12,026,302 B2
(45) Date of Patent: Jul. 2, 2024

(54) CONTROLLING A DEVICE SETTING USING HEAD POSE

(71) Applicant: Apple Inc., Cupertino, CA (US)

(72) Inventor: Gregory Lutter, Boulder Creek, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/295,772

(22) Filed: Apr. 4, 2023

(65) Prior Publication Data

US 2023/0418371 A1    Dec. 28, 2023

Related U.S. Application Data

(60) Provisional application No. 63/355,500, filed on Jun. 24, 2022.

(51) Int. Cl.
G09G 5/00         (2006.01)
G06F 3/01         (2006.01)
G06F 3/04847      (2022.01)

(52) U.S. Cl.
CPC .............. G06F 3/012 (2013.01); G06F 3/013 (2013.01); G06F 3/04847 (2013.01)

(58) Field of Classification Search
CPC ... G02B 27/0093; G02B 27/017; G06F 3/012; G06F 3/013; G06F 3/04847; G06V 10/46
See application file for complete search history.

(56) References Cited

U.S. PATENT DOCUMENTS

| | | | |
|---|---|---|---|
| 7,352,358 B2 * | 4/2008 | Zalewski | A63F 13/428 715/728 |
| 9,400,553 B2 * | 7/2016 | Kerr | G06F 3/0488 |
| 10,310,595 B2 * | 6/2019 | Tatsuta | G06F 3/147 |
| 10,607,413 B1 * | 3/2020 | Marcolina | G06F 3/012 |
| 11,055,923 B2 | 7/2021 | Sharma et al. | |
| 11,120,569 B2 * | 9/2021 | Ivanov Bonev | G06V 40/171 |
| 2014/0372944 A1 * | 12/2014 | Mulcahy | G06F 3/012 715/810 |
| 2017/0123491 A1 * | 5/2017 | Hansen | G06F 3/012 |
| 2023/0333642 A1 * | 10/2023 | Chimalamarri | G06V 10/462 |

FOREIGN PATENT DOCUMENTS

WO     2022155113 A1    7/2022

OTHER PUBLICATIONS

Steven M. Lavalle, Tracking, Virtual Reality, Chapter 9, Jan. 1, 2016, pp. 250-285, Cambridge University Press.

* cited by examiner

Primary Examiner — Joe H Cheng
(74) Attorney, Agent, or Firm — Treyz Law Group, P.C.; Joseph F. Guihan (57) ABSTRACT

A head-mounted device may use head pose changes for user input. In particular, a display in the head-mounted device may display a slider with an indicator. The slider may be a visual representation of a scalar quantity of a device setting such as volume or brightness. Based on head pose changes, the scalar quantity of the device setting and the position of the indicator on the slider may be updated. The direction of a head movement may correspond to the direction of movement of the indicator in the slider. The scalar quantity of a device setting may only be updated when gaze input from a user targets the slider. The slider may be displayed in response to gaze input targeting an icon associated with the slider.

24 Claims, 7 Drawing Sheets

CONTROLLING A DEVICE SETTING USING HEAD POSE

This application claims priority to U.S. provisional patent application No. 63/355,500, filed June, 24, 2022, which is hereby incorporated by reference herein in its entirety.

BACKGROUND

This relates generally to head-mounted devices, and, more particularly, to head-mounted devices with displays.

Some electronic devices such as head-mounted devices include displays that are positioned close to a user's eyes during operation (sometimes referred to as near-eye displays). The positioning of the near-eye displays may make it difficult to provide touch input to these displays. Accordingly, it may be more difficult than desired to control device settings on the head-mounted device.

SUMMARY

An electronic device may include one or more sensors, one or more displays, one or more processors, and memory storing instructions configured to be executed by the one or more processors, the instructions for: displaying, using the one or more displays, a user interface element comprising a visual representation of a scalar quantity of a device setting, obtaining, via a first subset of the one or more sensors, head pose information, updating the scalar quantity of the device setting based on the head pose information, and updating the visual representation of the scalar quantity based on the updated scalar quantity.

DETAILED DESCRIPTION

In some head-mounted devices, changes in head pose may be used to provide user input to the head-mounted device. In particular, changes in head pose may be used to adjust a slider that is a visual representation of a scalar quantity of a device setting such as speaker volume or display brightness. While the user gazes at the visual representation of the scalar quantity of the device setting, the scalar quantity of the device setting may be updated based on the head pose of the user. This provides a method for the user to adjust a device setting without touching the display.

Figure 1:
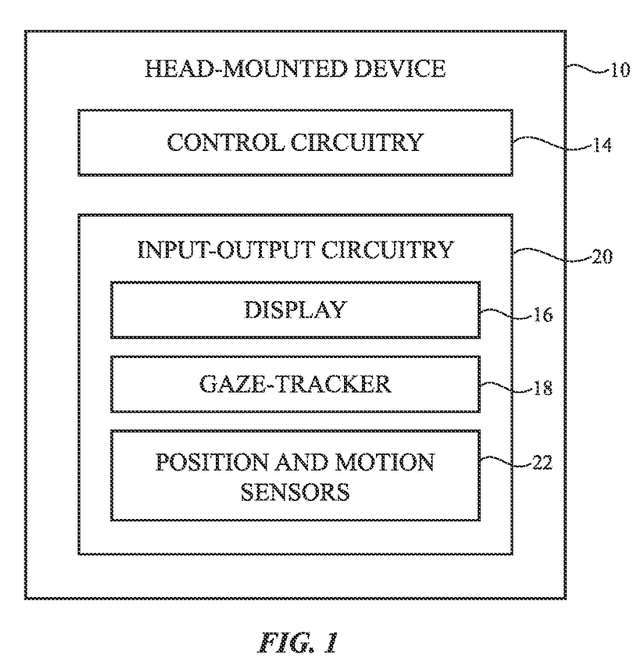
FIG. 1 is a schematic diagram of an illustrative head-mounted device in accordance with some embodiments.

A schematic diagram of an illustrative head-mounted device is shown in FIG. 1. As shown in FIG. 1, head-mounted device 10 (sometimes referred to as electronic device 10, system 10, head-mounted display 10, etc.) may have control circuitry 14. Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 20. Input-output circuitry 20 may be used to allow data to be received by head-mounted device 10 from external equipment (e.g., a tethered computer, a portable device such as a handheld device or laptop computer, or other electrical equipment) and to allow a user to provide head-mounted device 10 with user input. Input-output circuitry 20 may also be used to gather information on the environment in which head-mounted device 10 is operating. Output components in circuitry 20 may allow head-mounted device 10 to provide a user with output and may be used to communicate with external electrical equipment.

As shown in FIG. 1, input-output circuitry 20 may include a display such as display 16. Display 16 may be used to display images for a user of head-mounted device 10. Display 16 may be a transparent display so that a user may observe physical objects through the display while computer-generated content is overlaid on top of the physical objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display). Alternatively, display 16 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 16 is opaque, the display may also optionally display entirely computer-generated content (e.g., without displaying images of the physical environment).

Display 16 may include one or more optical systems (e.g., lenses) that allow a viewer to view images on display(s) 16. A single display 16 may produce images for both eyes or a pair of displays 16 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 20 may include various other input-output devices for gathering data and user input and for supplying a user with output. For example, input-output circuitry 20 may include a gaze-tracker 18 (sometimes referred to as a gaze-tracking system or a gaze-tracking camera).

Gaze-tracker 18 may include a camera and/or other gaze-tracking system components (e.g., light sources that emit beams of light so that reflections of the beams from a user's eyes may be detected) to monitor the user's eyes. Gaze-tracker(s) 18 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 18 is merely illustrative.

As shown in FIG. 1, input-output circuitry 20 may include position and motion sensors 22 (e.g., compasses, gyroscopes, accelerometers, and/or other devices for monitoring the location, pose, and movement of head-mounted device 10, satellite navigation system circuitry such as Global Positioning System circuitry for monitoring user location, etc.). Using sensors 22, for example, control circuitry 14 can monitor the current direction in which a user's head is oriented relative to the surrounding environment (e.g., a user's head pose).

Input-output circuitry 20 may also include other sensors and input-output components if desired (e.g., ambient light sensors, force sensors, temperature sensors, touch sensors, image sensors for detecting hand gestures or body poses, buttons, capacitive proximity sensors, light-based proximity sensors, other proximity sensors, strain gauges, gas sensors, pressure sensors, moisture sensors, magnetic sensors, microphones, speakers, audio components, haptic output devices, light-emitting diodes, other light sources, wired and/or wireless communications circuitry, etc.).

A user may provide user input to head-mounted device 10 using position and motion sensors 22. In particular, position and motion sensors 22 may detect changes in head pose (sometimes referred to as head movements) during operation of head-mounted device 10. The head movements may be used to adjust a scalar quantity of a device setting such as the volume of a speaker or the brightness of the display. In parallel with the adjustment of the scalar quantity based on the head movements, a visual representation of the scalar quantity may be displayed on the display (and updated based on the head movements).

Figure 2A:
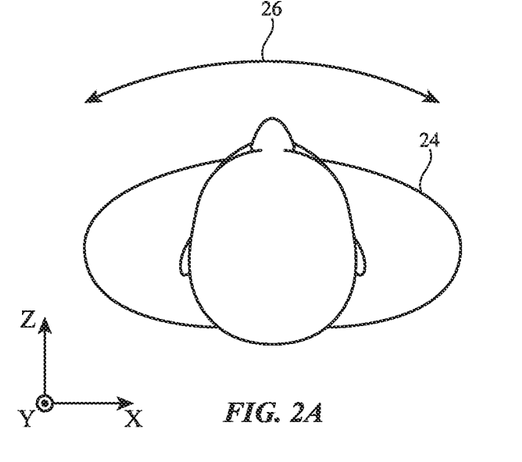
FIGS. 2A-2C are diagrams of an illustrative user of a head-mounted device showing how the user's head pose may be defined by yaw, roll, and pitch, respectively in accordance with some embodiments.
Figure 2B:
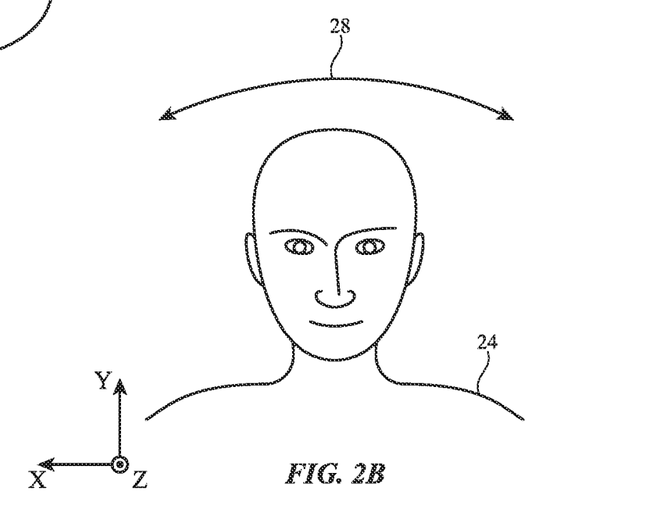
Figure 2C:
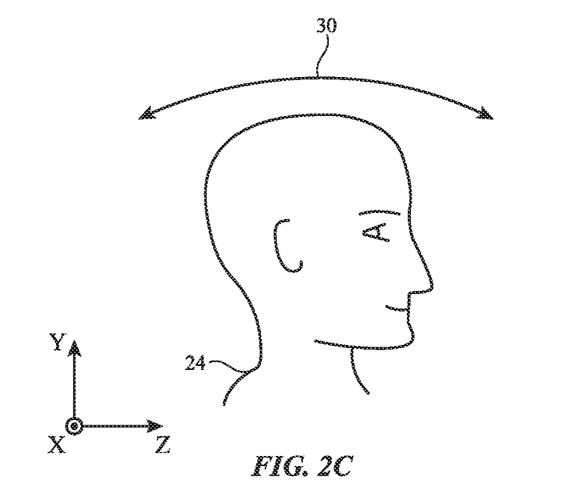

Changes in yaw, roll, and/or pitch of the user's head (and, correspondingly, the head-mounted device) may all be interpreted as user input if desired. FIGS. 2A-2C show how yaw, roll, and pitch may be defined for the user's head. FIGS. 2A-2C show a user 24. In each one of FIGS. 2A-2C, the user is facing the Z-direction and the Y-axis is aligned with the height of the user. The X-axis may be considered the side-to-side axis for the user's head, the Z-axis may be considered the front-to-back axis for the user's head, and the Y-axis may be considered the vertical axis for the user's head. The X-axis may be referred to as extending from the user's left ear to the user's right ear, as extending from the left side of the user's head to the right side of the user's head, etc. The Z-axis may be referred to as extending from the back of the user's head to the front of the user's head (e.g., to the user's face). The Y-axis may be referred to as extending from the bottom of the user's head to the top of the user's head.

As shown in FIG. 2A, yaw may be defined as the rotation around the vertical axis (e.g., the Y-axis in FIGS. 2A-2C). As the user's head rotates along direction 26, the yaw of the user's head changes. Yaw may sometimes alternatively be referred to as heading. The user's head may change yaw by rotating to the right or left around the vertical axis. A rotation to the right around the vertical axis (e.g., an increase in yaw) may be referred to as a rightward head movement. A rotation to the left around the vertical axis (e.g., a decrease in yaw) may be referred to as a leftward head movement.

As shown in FIG. 2B, roll may be defined as the rotation around the front-to-back axis (e.g., the Z-axis in FIGS. 2A-2C). As the user's head rotates along direction 28, the roll of the user's head changes. The user's head may change roll by rotating to the right or left around the front-to-back axis. A rotation to the right around the front-to-back axis (e.g., an increase in roll) may be referred to as a rightward head movement. A rotation to the left around the front-to-back axis (e.g., a decrease in roll) may be referred to as a leftward head movement.

As shown in FIG. 2C, pitch may be defined as the rotation around the side-to-side axis (e.g., the X-axis in FIGS. 2A-2C). As the user's head rotates along direction 30, the pitch of the user's head changes. The user's head may change pitch by rotating up or down around the side-to-side axis. A rotation down around the side-to-side axis (e.g., a decrease in pitch following the right arrow in direction 30 in FIG. 2C) may be referred to as a downward head movement. A rotation up around the side-to-side axis (e.g., an increase in pitch following the left arrow in direction 30 in FIG. 2C) may be referred to as an upward head movement.

It should be understood that position and motion sensors 22 may directly determine pose, movement, yaw, pitch, roll, etc. for head-mounted device 10. Position and motion sensors 22 may assume that the head-mounted device is mounted on the user's head. Therefore, herein, references to head pose, head movement, yaw of the user's head, pitch of the user's head, roll of the user's head, etc. may be considered interchangeable with references to device pose, device movement, yaw of the device, pitch of the device, roll of the device, etc.

At any given time, position and motion sensors 22 (and/or control circuitry 14) may determine the yaw, roll, and pitch of the user's head. The yaw, roll, and pitch of the user's head may collectively define the user's head pose. Detected changes in head pose may be used as user input to head-mounted device 10.

Figure 3A:
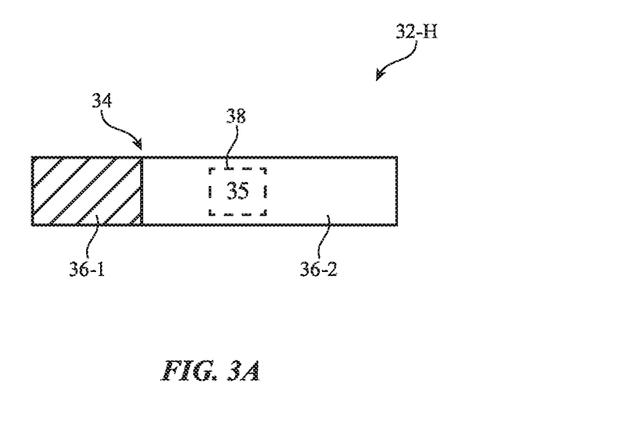
FIG. 3A is a view of an illustrative horizontal slider that represents a scalar quantity of a device setting in accordance with some embodiments.
Figure 3B:
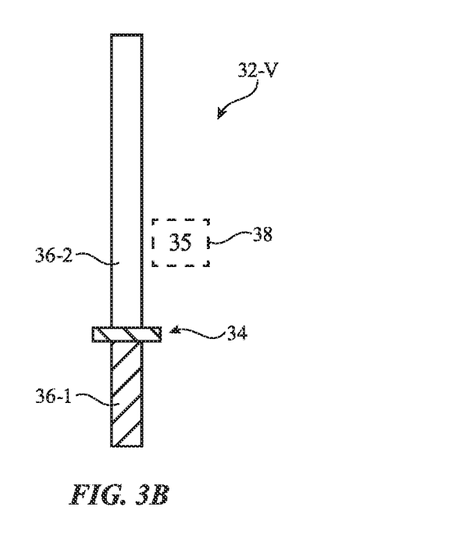
FIG. 3B is a view of an illustrative vertical slider that represents a scalar quantity of a device setting in accordance with some embodiments.
Figure 3C:
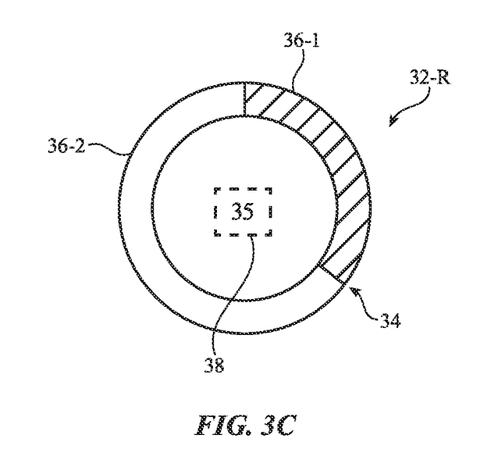
FIG. 3C is a view of an illustrative radial slider that represents a scalar quantity of a device setting in accordance with some embodiments.

In particular, changes in head pose may be used to adjust a scalar quantity of a device setting. Additionally, changes in head pose may be used to adjust a visual representation of the scalar quantity of the device setting. Herein, it may be assumed that adjustments to the scalar quantity of the device setting accompany adjustments to the visual representation of the scalar quantity of the device setting, and vice versa (even if not mentioned explicitly). One example for a visual representation of a scalar quantity of a device setting is a slider. FIGS. 3A-3C are views of illustrative sliders 32 that may be used to represent a scalar quantity of a device setting. FIG. 3A shows a horizontal slider 32-H with an indicator that moves horizontally. FIG. 3B shows a vertical slider 32-V with an indicator that moves vertically. FIG. 3C shows a radial slider 32-R with an indicator that moves radially. Each one of horizontal slider 32-H, vertical slider 32-V, and radial slider 32-R may sometimes be referred to as simply a slider, a user interface element, etc.

Each slider includes an indicator 34. Indicator 34 is a visual representation of the scalar quantity of the device setting corresponding to slider 32. There are numerous possible aesthetic appearances for indicator 34. In FIG. 3A, indicator 34 is an interface between a first portion 36-1 of the slider that has a first appearance and a second portion 36-2 that has a second appearance that is different than the first appearance. First and second portions 36-1 and 36-2 may have different colors, patterns, transparencies, or any other desired aesthetic property. The size of portions 36-1 and 36-2 may change with movement of indicator 34. For example, as indicator 34 slides to the right, portion 36-1 will become larger and portion 36-2 will become smaller. As indicator 34 slides to the left, portion 36-2 will become larger and portion 36-1 will become smaller.

Slider 32-H in FIG. 3A may optionally include a numeral area 38 that directly shows the scalar quantity of the device setting controlled by the slider in text form. In the example of FIG. 3A, the device setting has a scalar quantity of 35 (e.g., 35 on a scale from 0-100). Accordingly, the number 35 is displayed in numeral area 38 of slider 32-H.

In FIG. 3A, indicator 34 is the interface (border) between the different portions of the slider having different appearances. This example for an indicator is merely illustrative. In another example, shown in FIG. 3B, indicator 34 may have a distinct appearance from portions 36-1 and 36-2 on the slider.

In FIG. 3B, as indicator 34 slides down, portion 36-2 will become larger and portion 36-1 will become smaller. As indicator 34 slides up, portion 36-1 will become larger and portion 36-2 will become smaller. Slider 32-V includes a numeral area 38 on the right side of the slider. This example is merely illustrative and slider 32-V may optionally include a numeral area at any desired portion of the slider.

Slider 32-V in FIG. 3B has an indicator 34 with a distinct appearance from portions 36-1 and 36-2. In FIG. 3B, indicator 34 has a larger width than portions 36-1 and 36-2. Indicator 34 may instead or in addition have, for example, a distinct border that distinguishes indicator 34 from portions 36-1 and 36-2. In examples such as FIG. 3B where the position of indicator 34 is easily distinguishable from both portions 36-1 and 36-2, portions 36-1 and 36-2 may optionally have the same appearance. For example, portions 36-1 and 36-2 may have the same color and pattern and a user can still easily determine the relative position of indicator 34 along the slider.

FIG. 3C shows a radial slider 32-R with an indicator 34 that moves radially around the slider. As indicator 34 slides clockwise, portion 36-1 will become larger and portion 36-2 will become smaller. As indicator 34 slides counterclockwise, portion 36-2 will become larger and portion 36-1 will become smaller. Slider 32-R includes a numeral area 38 in the center of the slider. This example is merely illustrative and slider 32-R may optionally include a numeral area at any desired portion of the slider.

In FIG. 3A, sliding the indicator to the right may increase the scalar quantity of the device setting whereas sliding the indicator to the left may decrease the scalar quantity of the device setting. This example is merely illustrative, and the opposite arrangement may be used if desired.

In FIG. 3B, sliding the indicator up may increase the scalar quantity of the device setting whereas sliding the indicator down may decrease the scalar quantity of the device setting. This example is merely illustrative, and the opposite arrangement may be used if desired.

In FIG. 3C, sliding the indicator clockwise may increase the scalar quantity of the device setting whereas sliding the indicator counterclockwise may decrease the scalar quantity of the device setting. This example is merely illustrative, and the opposite arrangement may be used if desired.

In FIG. 3A, the indicator of slider 32-H (and the corresponding scalar quantity of the device setting) may be controlled by head movements. A head movement in a given direction may cause the indicator for the slider to slide in that given direction. For example, in FIG. 3A a rightward head movement (e.g., a change in yaw to the right and/or a change in roll to the right) may cause the indicator for the slider to slide to the right whereas a leftward head movement (e.g., a change in yaw to the left and/or a change in roll to the left) may cause the indicator for the slider to slide to the left. Instead or in addition, an upward head movement (e.g., an upward change in pitch) may cause the indicator for the slider to slide to the right whereas a downward head movement (e.g., a downward change in pitch) may cause the indicator for the slider to slide to the left. In some cases, head rotation of only one type may control the indicator of slider 32-H (e.g., only yaw, only roll, or only pitch is used as user input to the slider). Alternatively, head rotation of multiple types may control the indicator of slider 32-H (e.g., two or more of yaw, roll, and pitch are used as user input to the slider).

The indicator of slider 32-V (and the corresponding scalar quantity of the device setting) may be controlled by head movements. A head movement in a given direction may cause the indicator for the slider to slide in that given direction. For example, in FIG. 3B an upward head movement (e.g., an upward change in pitch) may cause the indicator for the slider to slide up whereas a downward head movement (e.g., a downward change in pitch) may cause the indicator for the slider to slide down. Instead or in addition, a rightward head movement (e.g., a change in yaw to the right and/or a change in roll to the right) may cause the indicator for the slider to slide up whereas a leftward head movement (e.g., a change in yaw to the left and/or a change in roll to the left) may cause the indicator for the slider to slide down. In some cases, head rotation of only one type may control the indicator of slider 32-V. Alternatively, head rotation of multiple types may control the indicator of slider 32-V.

The indicator of slider 32-R (and the corresponding scalar quantity of the device setting) may be controlled by head movements. For example, in FIG. 3C an upward head movement (e.g., an upward change in pitch) may cause the indicator for the slider to slide clockwise whereas a downward head movement (e.g., a downward change in pitch) may cause the indicator for the slider to slide counterclockwise. Instead or in addition, a rightward head movement (e.g., a change in yaw to the right and/or a change in roll to the right) may cause the indicator for the slider to slide clockwise whereas a leftward head movement (e.g., a change in yaw to the left and/or a change in roll to the left) may cause the indicator for the slider to slide counterclockwise. In some cases, head rotation of only one type may control the indicator of slider 32-R. Alternatively, head rotation of multiple types may control the indicator of slider 32-R.

Figure 4:
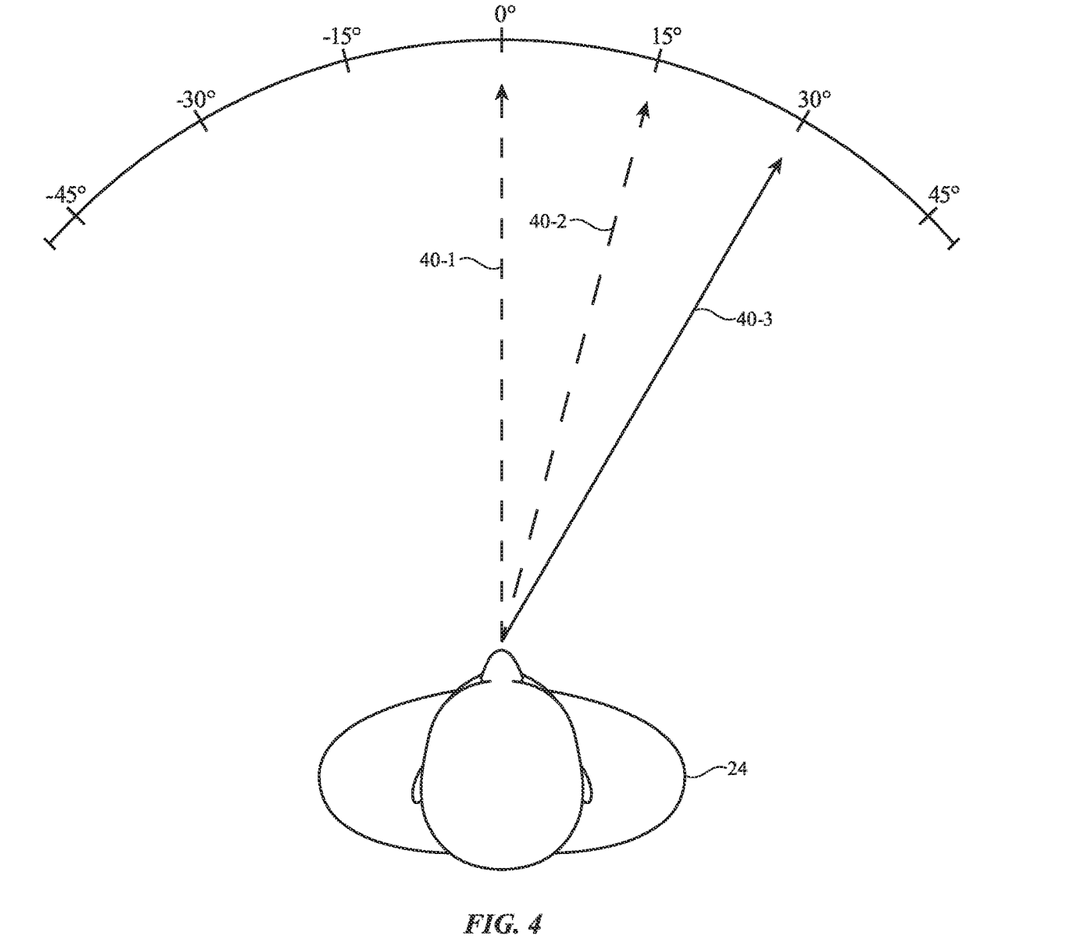
FIG. 4 is a diagram of an illustrative user with a changing head pose to adjust a scalar quantity of a device setting in accordance with some embodiments.

FIG. 4 is a diagram showing how a user may change their head pose to provide user input to head-mounted device 10. In FIG. 4, user 24 may look in direction 40-1 at a first time, may look in direction 40-2 at a second time, and may look in direction 40-3 at a third time. As shown in FIG. 4, the user's head has a yaw of 0 degrees while looking in direction 40-1, a yaw of 15 degrees while looking in direction 40-2, and a yaw of 30 degrees while looking in direction 40-3.

Head-mounted device 10 may interpret changes in head pose as user input to a slider in a variety of ways. Three such exemplary ways are: interpreting head pose changes as a constant rate change to the indicator of the slider, interpreting head pose changes as variable rate changes to the indicator of the slider, and interpreting head pose changes as a correlated to the indicator of the slider.

First, consider the example of interpreting head pose changes as a constant rate change to the indicator of the slider. When a user is looking in direction 40-1 (with a yaw of 0 degrees), the indicator of the slider may remain fixed. After the user makes a rightward head movement (e.g., moves their head to the right by 15 degrees to face direction 40-2), the indicator of the slider may move in the positive direction (e.g., to the right in FIG. 3A) at a constant rate. In other words, the slider may move in the positive direction as long as the user faces direction 40-2. The constant rate may be, for example, +1/second, +2/second, +3/second, etc. Consider the example in FIG. 3A where the horizontal slider starts at a value of 35. When a constant rate of +3/second is used, after 6 seconds facing direction 40-2 the scalar quantity represented by the slider will have increased from 35 to 53.

In the example of a constant rate for movement of the slider, the rate will remain the same regardless of the degree of change in the user's head pose. For example, if user 24 makes a rightward head movement (e.g., moves their head to the right by 15 additional degrees to face direction 40-3 instead of direction 40-2), the indicator of the slider may still move in the positive direction at the constant rate. If user 24 subsequently returns from direction 40-3 to direction 40-2, the indicator of the slider may still move in the positive direction at the constant rate. Therefore, a positive yaw results in a constant rate of change in the indicator of the slider. If, at any point, the user returns to face direction 40-1, the indicator of the slider will cease movement and remain fixed at its current position. If, at any point, the user makes a leftward head movement (and has a negative yaw), the slider may move in the negative direction at the constant rate (e.g., −1/second, −2/second, −3/second, etc.). The rate of movement of the indicator may have the same magnitude but a different sign for positive yaw and negative yaw.

Positive and negative yaw may be defined in absolute terms (e.g., relative to 0 degrees) or in relative terms (e.g., relative to the starting yaw when user input to the slider begins). For example, a user may initiate a slider adjustment while the user's head has a yaw of 15 degrees. If making changes in yaw based on absolute yaw, the slider value may increase by a constant rate when the yaw is greater than 0 degrees and decrease by the constant rate when the yaw is less than 0 degrees. If making changes in yaw based on relative yaw, the slider value may increase by a constant rate when the yaw is greater than 15 degrees and decrease by the constant rate when the yaw is less than 15 degrees.

Additionally, there may be a range of yaw in which the position of the slider remains fixed. For example, the slider will be fixed while the head pose has a yaw between −10 degrees and 10 degrees. When the yaw is greater than 10 degrees, the slider value may increase by a constant rate. When the yaw is less than −10 degrees, the slider value may decrease by the constant rate.

The example of the rate of change for the indicator of the slider being fixed is merely illustrative. Alternatively, the rate of change for the indicator of the slider may vary based on the head pose. When a user is looking in direction 40-1 (with a yaw of 0 degrees), the indicator of the slider may remain fixed. After the user makes a rightward head movement (e.g., moves their head to the right by 15 degrees to face direction 40-2), the indicator of the slider may move in the positive direction (e.g., to the right in FIG. 3A) at a first rate. The first rate may be, for example, +2/second. Consider the example in FIG. 3A where the horizontal slider starts at a value of 35. When a constant rate of +2/second is used, after 6 seconds facing direction 40-2 the slider value will have increased by 12 from 35 to 47.

If user 24 makes a rightward head movement (e.g., moves their head to the right by an additional 15 degrees to face direction 40-3 instead of direction 40-2), the indicator of the slider may move in the positive direction at a second rate that is greater than the first rate. The second rate may be, for example, +5/second. When a constant rate of +5/second is used, after 6 seconds facing direction 40-3 the slider value will have increased by 30 from 47 to 77. If user 24 returns from direction 40-3 to direction 40-2, the indicator of the slider may again move in the positive direction at the first rate (e.g., the rate associated with the yaw of direction 40-2).

Therefore, a positive yaw results in a positive rate of change in the slider. However, the positive rate of change may increase with increasingly positive yaw. The function correlating the rate of change to yaw may be linear (e.g., a gradual increase in rate with increasing yaw), non-linear (e.g., an exponential increase in rate with increasing yaw), or a step function (e.g., a first rate is used for a first range of yaw, a second rate is used for a second range of yaw, etc.).

In the varying rate method of input, as with the constant rate method of input, positive and negative yaw may be defined in absolute terms (e.g., relative to 0 degrees) or in relative terms (e.g., relative to the starting yaw when user input to the slider begins) as discussed above.

As yet another example, the scalar quantity represented by the slider may correlated to the head pose. Each degree of yaw may be correlated to a corresponding change in the slider value (e.g., +1, +2, +3, etc.). Consider an example where each degree of yaw is correlated to a change of +2 in the scalar quantity represented by the slider. A user may initiate user input to the slider when the slider has an initial scalar quantity of 35 as in FIG. 3A. 0 degrees of yaw may be the reference point for a change of 0 to the scalar quantity. If the user looks in direction 40-2 (with a yaw of 15 degrees), the scalar quantity will increase by 30 to a magnitude of 65. If the user looks in direction 40-3 (with a yaw of 30 degrees), the scalar quantity will increase by 60 (relative to the starting point) to a magnitude of 95. If the user were change their head pose back to a yaw of 15 degrees, the scalar quantity would again increase by 30 (relative to the starting point) to a magnitude of 65. If the user were change their head pose to have a yaw of −10 degrees, the scalar quantity would change by −20 (relative to the starting point) to a magnitude of 15.

When correlating the scalar quantity to the head pose as described above, the amount of change in the scalar quantity per degree in head pose (e.g., in yaw, roll, and/or pitch) may be selected at least partially based on the minimum and maximum values for the scalar quantity. Additionally, there may be a range of head poses in which the scalar quantity is correlated to head pose. Outside the range, the scalar quantity may stay fixed (e.g., at a minimum for the scalar quantity or a maximum for the scalar quantity). The minimum and maximum head pose (e.g., the minimum yaw and maximum yaw, the minimum roll and the maximum roll, the minimum pitch and the maximum pitch) for which the scalar quantity is correlated to head pose may be fixed (e.g., a default range for all users) or adjustable (e.g., customized to each user to account for more or less flexibility than the average person).

In the correlated method of input, positive and negative yaw may be defined in absolute terms (e.g., relative to 0 degrees) or in relative terms (e.g., relative to the starting yaw when user input to the slider begins) as discussed above.

Adjustments to the slider based on head pose have been described in FIG. 4 relative to yaw. However, it should be understood that the same principles may also be applied to changes in pitch and changes in roll.

It may be desirable for the slider (and, correspondingly, the scalar quantity of the device setting represented by the slider) to only sometimes be responsive to head pose changes during operation of head-mounted device. In other words, the user may normally operate the head-mounted device without head pose changes causing any changes to the slider (and the scalar quantity of the device setting it controls). The user may selectively place the slider in an adjustable mode where the slider is responsive to head pose changes. Once the slider has been adjusted to the user's satisfaction, the user may place the slider back in a fixed mode where head pose changes do not cause any changes to the slider (and the scalar quantity of the device setting it controls).

Any desired user input may trigger the slider switching between the fixed mode and the adjustable mode. For example, the user may provide a verbal command, a gesture input (e.g., a hand gesture), or other selection input to switch the slider between the fixed mode and the adjustable mode. One possible input for switching the slider between the fixed mode and the adjustable mode that will be discussed herein is gaze input. As previously mentioned, gaze-tracker 18 may track a user's point of gaze. In one illustrative example, shown in FIGS. 5A-5D, the slider may be in an adjustable mode when the user's point of gaze targets the slider and may be in a fixed mode when the user's point of gaze does not target the slider.

Figure 5A:
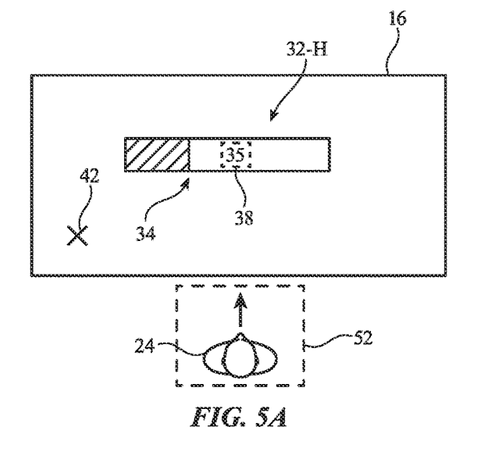
FIGS. 5A-5D are views of an illustrative display with a horizontal slider that switches between a fixed mode and an adjustable mode based on gaze input in accordance with some embodiments.

FIGS. 5A-5D are views of display 16 with slider 32-H. Each one of FIGS. 5A-5D also shows the user's head pose in area 52. As previously discussed, slider 32-H has an indicator 34 and numeral area 38. In FIG. 5A, point of gaze 42 for the user does not target slider 32-H. In other words, the point of gaze 42 is elsewhere on display 16 and does not overlap slider 32-H. When point of gaze 42 for the user does not target slider 32-H, slider 32-H may be in a fixed mode and the scalar quantity of the device setting controlled by the slider is fixed (even when head pose changes are detected).

Figure 5B:
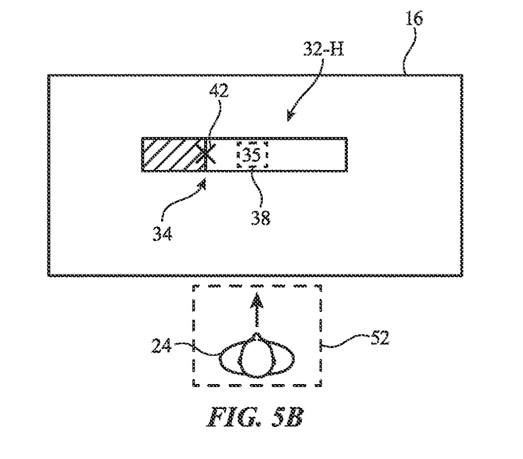

In FIG. 5B, point of gaze 42 targets slider 32-H. In other words, the point of gaze 42 overlaps slider 32-H. When point of gaze 42 targets slider 32-H, slider 32-H may be in an adjustable mode and the scalar quantity of the device setting controlled by the slider is adjusted based on head pose changes. The scalar quantity of the device setting may be adjusted in any of the manners described previously (e.g., using yaw, roll, and/or pitch to adjust the scalar quantity at a constant rate at different head poses, at different rates at different head poses, or based on a correlation between a starting head pose and an ending head pose).

If desired, the slider may only switch from the fixed mode to the adjustable mode when the gaze input targets the slider for at least a given dwell time (e.g., more than 50 milliseconds, more than 100 milliseconds, more than 200 milliseconds, more than 500 milliseconds, more than 1 second, etc.).

The user's head pose when the slider switches from the fixed mode to the adjustable mode in FIG. 5B (e.g., in response to gaze input targeting the slider) may be used as an initial head pose for subsequent updates to the scalar quantity that are based on an initial head pose.

Figure 5C:
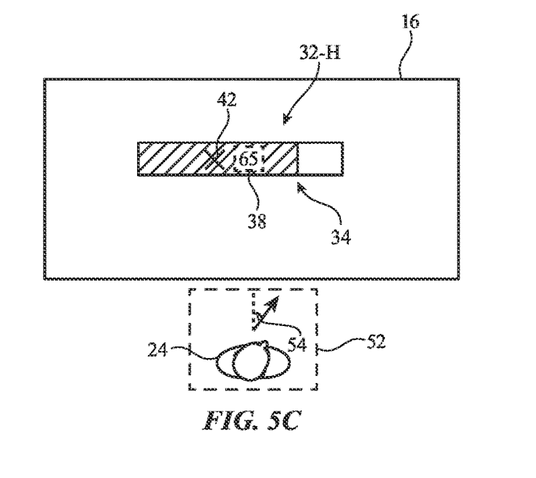

In FIG. 5C, head pose changes cause the scalar quantity of the device setting to increase from 35 to 65 while the slider is in the adjustable mode. The slider may remain in the adjustable mode while point of gaze 42 targets the slider (as in FIGS. 5B and 5C).

As shown in area 52 of FIGS. 5A and 5B, the user's head is facing directly forward (e.g., with a yaw of 0 degrees) in FIGS. 5A and 5B. However, between FIGS. 5B and 5C, the yaw of the user's head increases by angle 54. Because the gaze input is targeting slider 32-H between FIGS. 5B and 5C (and the slider is in the adjustable mode), the change in yaw between FIGS. 5B and 5C changes the scalar quantity represented by slider 32-H.

Figure 5D:
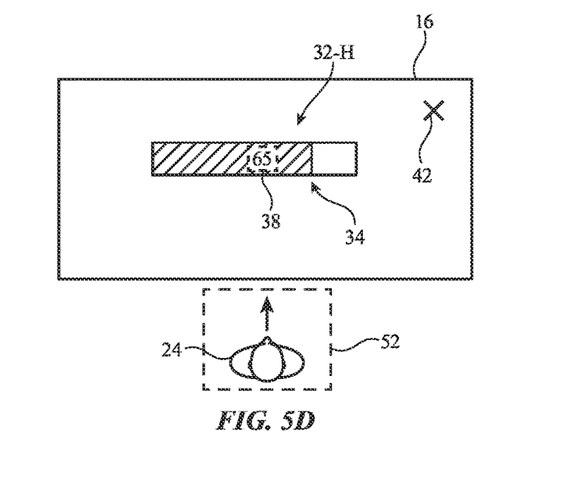

In FIG. 5D, the point of gaze no longer targets the slider so the slider returns to the fixed mode and the scalar quantity of the device setting controlled by the slider is fixed at the updated value of 65 (even when head pose changes are detected). Between FIGS. 5C and 5D, the yaw of the user's head decreases back to an angle of 0 degrees. However, because the gaze input is not targeting slider 32-H between FIGS. 5C and 5D (and the slider is therefore in the fixed mode), the change in yaw between FIGS. 5C and 5D does not change the scalar quantity represented by slider 32-H.

In the example of FIGS. 5A-5D, gaze input (e.g., from gaze-tracker 18) is used to switch slider 32-H from a fixed mode to an adjustable mode. This example is merely illustrative. If desired, other types of input may be used to switch a slider between a fixed mode and an adjustable mode. For example, input from a remote control that is operable with head-mounted device 10 may be used to switch the slider between a fixed mode and an adjustable mode. One or more additional components on the head-mounted device (e.g., a button, touch sensor, etc.) may be used to gather user input that switches the slider between a fixed mode and an adjustable mode.

In the example of FIGS. 5A-5D, slider 32-H is continuously displayed on display 16. Alternatively, an icon (sometimes referred to as a user interface element) may be continuously displayed on display 16. The slider may be displayed in response to the point of gaze targeting the icon. The scalar quantity of the device setting controlled by the slider is fixed when the slider is not displayed. The scalar quantity of the device setting controlled by the slider is adjustable when the slider is displayed after the icon is targeted by the point of gaze.

FIGS. 6A-6D are views of display 16 with an icon 44. Each one of FIGS. 6A-6D also shows the user's head pose in area 52. In this example, icon 44 is a volume icon and the slider associated with icon 44 is used to control a volume for head-mounted device 10. This example is merely illustrative, and any other desired icon (and corresponding device setting) may be used. As one alternative, icon 44 may be a brightness icon (e.g., a sun) and the slider associated with icon 44 may be used to control display brightness.

Figure 6A:
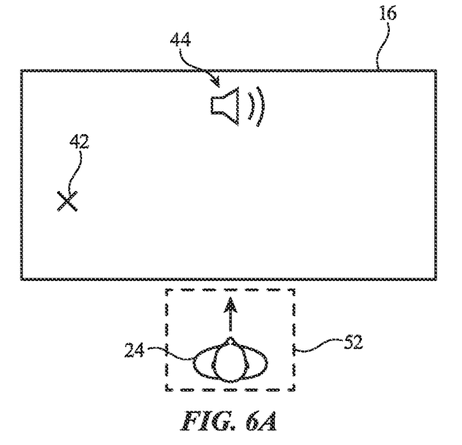
FIGS. 6A-6D are views of an illustrative display with an icon and a radial slider that is selectively displayed based on gaze input in accordance with some embodiments.

In FIG. 6A, point of gaze 42 does not target icon 44. Accordingly, no slider is displayed and the scalar quantity of the device setting controlled by the slider is fixed.

Figure 6B:
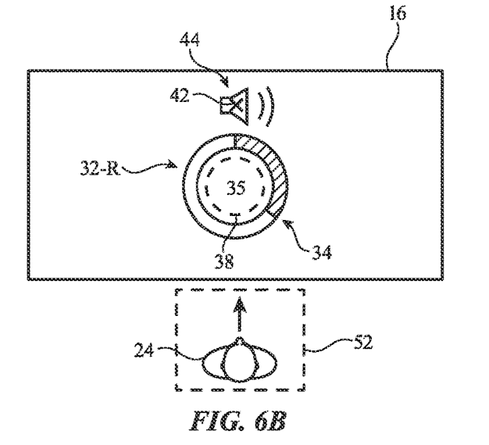

In FIG. 6B, point of gaze 42 targets (e.g., overlaps) icon 44. This causes slider 32-R to be displayed. Slider 32-R may be displayed adjacent to icon 44 (e.g., below icon 44 in FIG. 6B). As previously discussed, slider 32-R has an indicator 34 and numeral area 38. When slider 32-R is displayed (as in FIG. 6B), the slider may be in an adjustable mode where the scalar quantity of the device setting controlled by the slider is adjusted based on head pose changes. Alternatively, slider 32-R may be placed in the fixed mode when initially displayed. The slider 32-R then enters the adjustable mode when gaze input form the user targets the slider 32-R instead of the icon 44. This essentially serves as a second confirmation step to make sure that the user wants to change the setting. The scalar quantity of the device setting may be adjusted in any of the manners described previously (e.g., using yaw, roll, and/or pitch to adjust the scalar quantity at a constant rate at different head poses, at different rates at different head poses, or based on a correlation between a starting head pose and an ending head pose).

If desired, the slider may only be displayed when the gaze input targets the icon for at least a given dwell time (e.g., more than 50 milliseconds, more than 100 milliseconds, more than 200 milliseconds, more than 500 milliseconds, more than 1 second, etc.).

The user's head pose when the slider is displayed in FIG. 6B (e.g., in response to gaze input targeting the icon) may be used as an initial head pose for subsequent updates to the scalar quantity that are based on an initial head pose.

Figure 6C:
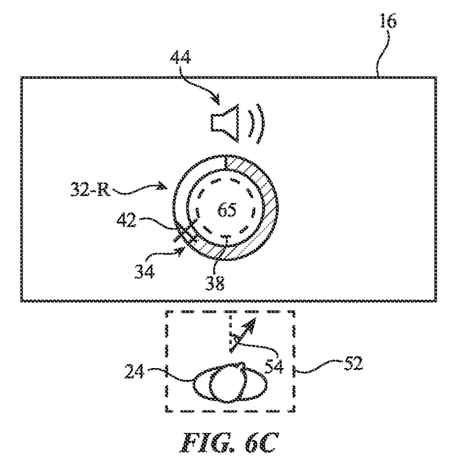

In FIG. 6C, head pose changes cause the scalar quantity of the device setting to increase from 35 to 65 while the slider is in the adjustable mode. The slider may remain displayed (and in the adjustable mode) while point of gaze 42 targets either slider 32-R or icon 44. Alternatively, the slider may remain displayed (and in the adjustable mode) only while point of gaze 42 targets slider 32-R (and not icon 44). Alternatively, the slider may remain displayed (and in the adjustable mode) only while point of gaze 42 targets icon 44 (and not slider 32-R). In the example of FIG. 6C, the slider remains displayed (and in the adjustable mode) while point of gaze 42 targets either slider 32-R or icon 44. Therefore, the slider remains displayed (and in the adjustable mode) in FIG. 6C when the point of gaze targets slider 32-R. However, the slider is no longer displayed (and is therefore in a fixed mode) in FIG. 6D when point of gaze 42 drifts away from both the slider and icon 44.

Figure 6D:
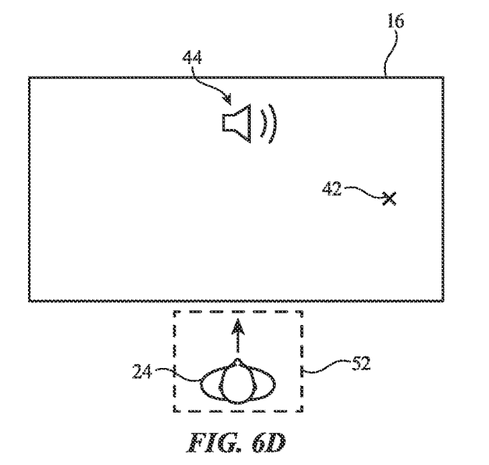

If desired, the slider may only enter the fixed mode (and no longer be displayed) when the gaze input leaves a given area (e.g., the slider or the icon, the slider, or the icon) for at least a given dwell time (e.g., more than 50 milliseconds, more than 100 milliseconds, more than 200 milliseconds, more than 500 milliseconds, more than 1 second, etc.).

In another possible user experience, the slider may be displayed in response to the point of gaze targeting icon 44. The slider may then be adjustable while the point of gaze targets the slider or any other portion of the display. The slider is no longer displayed and enters the fixed mode only when the point of gaze again targets icon 44. In other words, the user looks at icon 44 to fix or lock the scalar quantity of the device setting once they are done with updating the scalar quantity of the device setting.

As shown in area 52 of FIGS. 6A and 6B, the user's head is facing directly forward (e.g., with a yaw of 0 degrees) in FIGS. 6A and 6B. However, between FIGS. 6B and 6C, the yaw of the user's head increases by angle 54. Because the slider is in an adjustable mode between FIGS. 6B and 6C, the change in yaw between FIGS. 6B and 6C changes the scalar quantity represented by slider 32-R. Between FIGS. 6C and 6D, the yaw of the user's head decreases back to an angle of 0 degrees. However, because the gaze input is not targeting slider 32-H between FIGS. 6C and 6D, the slider is not in the adjustable mode and the change in yaw between FIGS. 6C and 6D does not change the scalar quantity represented by slider 32-R.

In the example of FIGS. 6A-6D, gaze input (e.g., from gaze-tracker 18) is used to target icon 44 and cause slider 32-R to be displayed in an adjustable mode. This example is merely illustrative. Other types of input may be used to target the icon and cause the slider to be displayed (e.g., input from a remote control that is operable with head-mounted device 10, input from one or more additional components on the head-mounted device such as a button or touch sensor, etc.).

Figure 7:
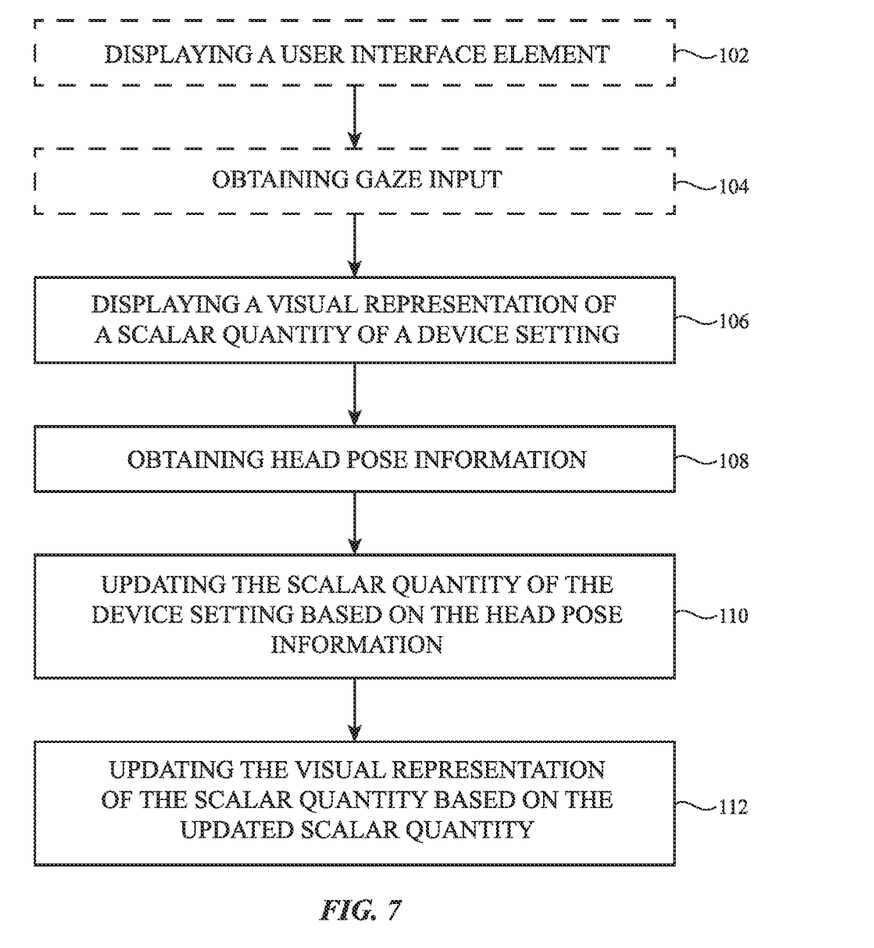
FIG. 7 is a flowchart showing an illustrative method performed by a head-mounted device in accordance with some embodiments.

FIG. 7 is a flowchart showing an illustrative method performed by a head-mounted device (e.g., control circuitry 14 in device 10). The blocks of FIG. 7 may be stored as instructions in memory of electronic device 10, with the instructions configured to be executed by one or more processors in the electronic device.

At optional block 102, control circuitry 14 may display a user interface element on the display. The user interface element may be, for example, an icon such as icon 44 in FIGS. 6A-6D. At optional block 104, control circuitry 14 may obtain gaze input (e.g., from gaze-tracker 18). Gaze input may optionally be used to trigger the display of a slider that is a visual representation of a scalar quantity of a device setting (e.g., adjacent to the user interface element from block 102). Gaze input may optionally be used to trigger a slider (that is already on the display) being switched between a fixed mode and an adjustable mode. The example of obtaining gaze input at block 104 is merely illustrative. If desired, other user input may be obtained at block 104 (e.g., from a remote control operable with head-mounted device 10, from a button on head-mounted device 10, from a touch sensor on head-mounted device 10, etc.) that is used to trigger the display of a slider that is a visual representation of a scalar quantity of a device setting and/or trigger a slider (that is already on the display) being switched between a fixed mode and an adjustable mode.

At block 106, control circuitry 14 may display a visual representation of a scalar quantity of a device setting on the display. The visual representation of the scalar quantity of the device setting may sometimes be referred to as a user interface element. The visual representation may be, for example, a slider such as one of the sliders shown in FIGS. 3A-3C. The slider shows the current scalar quantity of a device setting such as volume or brightness. In some cases, the slider may continuously be displayed on display 16. In some cases, displaying the visual representation in block 106 may be triggered by gaze input (or other user input) targeting the user interface element displayed at block 102. The device setting for the slider may be associated with the user interface element displayed at block 102 in this example (e.g., the slider controls volume when a volume icon is displayed at block 102 or the slider controls display brightness when a brightness icon is displayed at block 102).

At block 108, control circuitry 14 may obtain head pose information (e.g., from position and motion sensors 22). In some cases, the same sensor(s) may obtain both gaze input and head pose information. The head pose information may indicate the yaw, pitch, and roll of the user's head over time.

At block 110, control circuitry 14 may update the scalar quantity of the device setting based on the head pose information. The user may change their head pose to increase the scalar quantity or decrease the scalar quantity. As previously described, the scalar quantity may increase at a constant or variable rate when yaw is positive, may increase at a constant or variable rate when roll is positive, and/or may increase at a constant or variable rate when pitch is positive. Alternatively, the scalar quantity may increase at a constant or variable rate when a change in yaw from an initial yaw is positive, may increase at a constant or variable rate when a change in roll from an initial roll is positive, and/or may increase at a constant or variable rate when a change in pitch from an initial pitch is positive. Similarly, the scalar quantity may decrease at a constant or variable rate when yaw is negative, may decrease at a constant or variable rate when roll is negative, and/or may decrease at a constant or variable rate when pitch is negative. Alternatively, the scalar quantity may decrease at a constant or variable rate when a change in yaw from an initial yaw is negative, may decrease at a constant or variable rate when a change in roll from an initial roll is negative, and/or may decrease at a constant or variable rate when a change in pitch from an initial pitch is negative. As yet another option, the scalar quantity may increase or decrease in a correlated fashion to the yaw (from a reference point of 0 degrees), may increase or decrease in a correlated fashion to the roll (from a reference point of 0 degrees), and/or may increase or decrease in a correlated fashion to the pitch (from a reference point of 0 degrees). Alternatively, the scalar quantity may increase or decrease in a correlated fashion to the change in yaw from an initial yaw, may increase or decrease in a correlated fashion to the change in roll from an initial roll, and/or may increase or decrease in a correlated fashion to the change in pitch from an initial pitch.

Changes in head pose may only be used to update the scalar quantity of the device setting when the visual representation of the scalar quantity of the device setting (and the scalar quantity itself) is in an adjustable mode. When the visual representation of the scalar quantity of the device setting (and the scalar quantity itself) is in a fixed mode, changes in head pose do not change the scalar quantity of the device setting.

At block 112, control circuitry 14 may update the visual representation of the scalar quantity of the device setting based on the updated scalar quantity. In other words, the visual representation displayed at block 106 may be updated to reflect the current scalar quantity of the device setting. In the example where the visual representation in block 106 is a slider, the indicator of the slider may move in a direction that is correlated to the direction of a user's head movement. For example, when the scalar quantity is updated based on a rightward head movement in block 110, the indicator in a horizontal slider may be moved to the right in block 112. When the scalar quantity is updated based on a leftward head movement in block 110, the indicator in a horizontal slider may be moved to the left in block 112. When the scalar quantity is updated based on an upward head movement in block 110, the indicator in a vertical slider may be moved up in block 112. When the scalar quantity is updated based on a downward head movement in block 110, the indicator in a vertical slider may be moved down in block 112. When the scalar quantity is updated based on a rightward head movement in block 110, the indicator in a radial slider may be moved clockwise in block 112. When the scalar quantity is updated based on a leftward head movement in block 110, the indicator in a radial slider may be moved counterclockwise in block 112.

Out of an abundance of caution, it is noted that to the extent that any implementation of this technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:
    one or more sensors;
    one or more displays;
    one or more processors; and
    memory storing instructions configured to be executed by the one or more processors, the instructions for:
        displaying, using the one or more displays, a user interface element comprising a visual representation of a scalar quantity of a device setting, wherein the device setting comprises a speaker volume or a display brightness;
        obtaining, via a first subset of the one or more sensors, head pose information;
        updating the scalar quantity of the device setting based on the head pose information; and
        updating the visual representation of the scalar quantity based on the updated scalar quantity.

2. The electronic device defined in claim 1, wherein the instructions further comprise instructions for:
    prior to displaying the user interface element, displaying, using the one or more displays, an additional user interface element; and
    obtaining, via a second subset of the one or more sensors, a gaze input, wherein displaying the user interface element comprises displaying the user interface element in accordance with a determination that the gaze input targets the additional user interface element.

3. The electronic device defined in claim 1, wherein the instructions further comprise instructions for:

obtaining, via a second subset of the one or more sensors, a gaze input, wherein updating the scalar quantity of the device setting based on the head pose information comprises updating the scalar quantity of the device setting based on the head pose information in accordance with a determination that the gaze input targets the user interface element.

4. The electronic device defined in claim 3, wherein the instructions further comprise instructions for:
in accordance with a determination that the gaze input no longer targets the user interface element, ceasing to display the user interface element and ceasing to update the scalar quantity of the device setting.

5. The electronic device defined in claim 1, wherein the user interface element comprises:
a horizontal slider with an indicator that moves left and right, wherein updating the visual representation of the scalar quantity comprises moving the indicator of the horizontal slider in accordance with a determination that the head pose information indicates a change in yaw;
a vertical slider with an indicator that moves up and down, wherein updating the visual representation of the scalar quantity comprises moving the indicator of the vertical slider in accordance with a determination that the head pose information indicates a change in pitch; or
a radial slider with an indicator that moves radially, wherein updating the visual representation of the scalar quantity comprises moving the indicator of the radial slider in accordance with a determination that the head pose information indicates a change in roll.

6. The electronic device defined in claim 1, wherein the user interface element comprises a slider with an indicator.

7. The electronic device defined in claim 6, wherein updating the visual representation of the scalar quantity comprises moving the indicator of the slider in a given direction in accordance with a determination that the head pose information indicates a head movement in the given direction.

8. The electronic device defined in claim 1, wherein obtaining the head pose information comprises obtaining a first head pose at a first time when a gaze input targets the user interface element and obtaining a second head pose at a second time that is subsequent to the first time and wherein updating the scalar quantity of the device setting based on the head pose information comprises updating the scalar quantity of the device setting based on a change between the first head pose and the second head pose.

9. A method of operating an electronic device that comprises one or more displays, the method comprising:
displaying, using the one or more displays, a user interface element comprising a visual representation of a scalar quantity of a device setting, wherein the device setting comprises a speaker volume or a display brightness;
obtaining, via a first subset of the one or more sensors, head pose information;
updating the scalar quantity of the device setting based on the head pose information; and
updating the visual representation of the scalar quantity based on the updated scalar quantity.

10. The method defined in claim 9, further comprising:
prior to displaying the user interface element, displaying, using the one or more displays, an additional user interface element; and
obtaining, via a second subset of the one or more sensors, a gaze input, wherein displaying the user interface element comprises displaying the user interface element in accordance with a determination that the gaze input targets the additional user interface element.

11. The method defined in claim 9, further comprising:
obtaining, via a second subset of the one or more sensors, a gaze input, wherein updating the scalar quantity of the device setting based on the head pose information comprises updating the scalar quantity of the device setting based on the head pose information in accordance with a determination that the gaze input targets the user interface element.

12. The method defined in claim 11, further comprising:
in accordance with a determination that the gaze input no longer targets the user interface element, ceasing to display the user interface element and ceasing to update the scalar quantity of the device setting.

13. The method defined in claim 9, wherein the user interface element comprises:
a horizontal slider with an indicator that moves left and right, wherein updating the visual representation of the scalar quantity comprises moving the indicator of the horizontal slider in accordance with a determination that the head pose information indicates a change in yaw;
a vertical slider with an indicator that moves up and down, wherein updating the visual representation of the scalar quantity comprises moving the indicator of the vertical slider in accordance with a determination that the head pose information indicates a change in pitch; or
a radial slider with an indicator that moves radially, wherein updating the visual representation of the scalar quantity comprises moving the indicator of the radial slider in accordance with a determination that the head pose information indicates a change in roll.

14. The method defined in claim 9, wherein the user interface element comprises a slider with an indicator.

15. The method defined in claim 14, wherein updating the visual representation of the scalar quantity comprises moving the indicator of the slider in a given direction in accordance with a determination that the head pose information indicates a head movement in the given direction.

16. The method defined in claim 9, wherein obtaining the head pose information comprises obtaining a first head pose at a first time when a gaze input targets the user interface element and obtaining a second head pose at a second time that is subsequent to the first time and wherein updating the scalar quantity of the device setting based on the head pose information comprises updating the scalar quantity of the device setting based on a change between the first head pose and the second head pose.

17. A non-transitory computer-readable storage medium storing one or more programs configured to be executed by one or more processors of an electronic device that comprises one or more displays, the one or more programs including instructions for:
displaying, using the one or more displays, a user interface element comprising a visual representation of a scalar quantity of a device setting, wherein the device setting comprises a speaker volume or a display brightness;
obtaining, via a first subset of the one or more sensors, head pose information;
updating the scalar quantity of the device setting based on the head pose information; and
updating the visual representation of the scalar quantity based on the updated scalar quantity.

18. The non-transitory computer-readable storage medium defined in claim 17, wherein the instructions further comprise instructions for:
  prior to displaying the user interface element, displaying, using the one or more displays, an additional user interface element; and
obtaining, via a second subset of the one or more sensors, a gaze input, wherein displaying the user interface element comprises displaying the user interface element in accordance with a determination that the gaze input targets the additional user interface element.

19. The non-transitory computer-readable storage medium defined in claim 17, wherein the instructions further comprise instructions for:
  obtaining, via a second subset of the one or more sensors, a gaze input, wherein updating the scalar quantity of the device setting based on the head pose information comprises updating the scalar quantity of the device setting based on the head pose information in accordance with a determination that the gaze input targets the user interface element.

20. The non-transitory computer-readable storage medium defined in claim 19, wherein the instructions further comprise instructions for:
  in accordance with a determination that the gaze input no longer targets the user interface element, ceasing to display the user interface element and ceasing to update the scalar quantity of the device setting.

21. The non-transitory computer-readable storage medium defined in claim 17, wherein the user interface element comprises:
  a horizontal slider with an indicator that moves left and right, wherein updating the visual representation of the scalar quantity comprises moving the indicator of the horizontal slider in accordance with a determination that the head pose information indicates a change in yaw;
  a vertical slider with an indicator that moves up and down, wherein updating the visual representation of the scalar quantity comprises moving the indicator of the vertical slider in accordance with a determination that the head pose information indicates a change in pitch; or
  a radial slider with an indicator that moves radially, wherein updating the visual representation of the scalar quantity comprises moving the indicator of the radial slider in accordance with a determination that the head pose information indicates a change in roll.

22. The non-transitory computer-readable storage medium defined in claim 17, wherein the user interface element comprises a slider with an indicator.

23. The non-transitory computer-readable storage medium defined in claim 22, wherein updating the visual representation of the scalar quantity comprises moving the indicator of the slider in a given direction in accordance with a determination that the head pose information indicates a head movement in the given direction.

24. The non-transitory computer-readable storage medium defined in claim 17, wherein obtaining the head pose information comprises obtaining a first head pose at a first time when a gaze input targets the user interface element and obtaining a second head pose at a second time that is subsequent to the first time and wherein updating the scalar quantity of the device setting based on the head pose information comprises updating the scalar quantity of the device setting based on a change between the first head pose and the second head pose.

\* \* \* \* \*